United States Patent [19]
Seidel et al.

[11] Patent Number: 5,940,460
[45] Date of Patent: Aug. 17, 1999

[54] SOLID STATE NEUTRON DETECTOR ARRAY

[75] Inventors: John G. Seidel, Pittsburgh; Frank H. Ruddy, Monroeville; Charles D. Brandt, Mount Lebanon; Abdul R. Dulloo; Randy G. Lott, both of Pittsburgh; Ernest Sirianni, Monroeville; Randall O. Wilson, Greensburg, all of Pa.

[73] Assignee: The United States of America as represented by the United States Department of Energy, Washington, D.C.

[21] Appl. No.: 08/931,084

[22] Filed: Sep. 15, 1997

[51] Int. Cl.$^6$ ........................................... G01T 1/00
[52] U.S. Cl. .................... 376/153; 376/155; 250/370.01; 250/370.05; 250/390.01; 250/390.11; 257/429
[58] Field of Search ..................... 376/153, 155; 250/370.01, 370.05, 390.11, 390.01; 257/429

[56] References Cited

U.S. PATENT DOCUMENTS

| | | | |
|---|---|---|---|
| 3,227,876 | 1/1966 | Ross | 250/83.1 |
| 3,805,078 | 4/1974 | Kozlov | 250/390 |
| 3,832,668 | 8/1974 | Berman | 338/22 SD |
| 4,267,454 | 5/1981 | Playfoot et al. | 250/370 |
| 4,284,893 | 8/1981 | Allan et al. | 250/390 |
| 4,419,578 | 12/1983 | Kress | 250/390 |
| 4,614,635 | 9/1986 | Terhune | 376/154 |
| 5,002,720 | 3/1991 | Berggren | 376/154 |
| 5,281,822 | 1/1994 | Albrecht et al. | 250/370.05 |
| 5,378,921 | 1/1995 | Ueda | 257/574 |
| 5,726,453 | 3/1998 | Lott et al. | 250/390.01 |

FOREIGN PATENT DOCUMENTS 7-306272  11/1995  Japan ................ 250/390.01

OTHER PUBLICATIONS

Nakaoka et al., Neutron Measuring Equipment, Patent Abstracts of Japan, JP 07–306272, Nov. 1995.

Primary Examiner—Charles T. Jordan
Assistant Examiner—J. Keith

[57] ABSTRACT

A neutron detector array is capable of measuring a wide range of neutron fluxes. The array includes multiple semiconductor neutron detectors. Each detector has a semiconductor active region that is resistant to radiation damage. In one embodiment, the array preferably has a relatively small size, making it possible to place the array in confined locations. The ability of the array to detect a wide range of neutron fluxes is highly advantageous for many applications such as detecting neutron flux during start up, ramp up and full power of nuclear reactors.

23 Claims, 4 Drawing Sheets

5,940,460

SOLID STATE NEUTRON DETECTOR ARRAY

GOVERNMENT CONTRACT

The Government of the United States of America has certain rights in this invention pursuant to Contract No. DE-AC-11-93PN38195 awarded by the United States Department of Energy.

FIELD OF THE INVENTION

The present invention relates to neutron detectors, and more particularly relates to an array of solid state neutron detectors capable of measuring a wide range of neutron fluxes generated by nuclear power reactors and the like.

BACKGROUND INFORMATION

Neutron detection is conventionally accomplished by using a detector of ionizing radiation and employing a conversion nuclear reaction whereby the neutron produces a charged particle product. The first neutron detectors were gas proportional counters which detected ionization produced by the highly charged fission fragments produced in neutron induced fission of $^{235}U$.

An alternative to using a gas-filled detector is to use a semiconductor or solid state detector. Conventional semiconductor neutron detectors consist of a silicon surface barrier detector with a layer of boron, lithium or fissionable material adjacent to the active volume of the detector. One such solid state neutron detector using a silicon semiconductor is disclosed in U.S. Pat. No. 3,227,876.

A problem with prior art neutron detectors is sensitivity of the detector to non-neutronic components of the radiation field, particularly gamma ray sensitivity. Gas-filled detectors are favored in nuclear reactor applications because low density gases are inherently inefficient detectors for gamma rays which deposit their energy over large volumes. Solid-state detectors, on the other hand, are more sensitive to gamma rays because of their higher electron density.

Another problem with conventional neutron detectors used in nuclear reactors is their inability to operate over the entire power range of the reactor. Different types of gas-filled detectors are currently used during start up (<1 n/cm$^2$/sec), ramp up ($10^3$–$10^7$ n/cm$^2$/sec), and full power ($10^9$–$10^{11}$ n/cm$^2$/sec) of the nuclear reactor.

Solid-state semiconductor detectors are candidates for replacement of conventional gas-filled detectors, but they have not found widespread use in the nuclear industry because of problems associated with background signal and deterioration of detector performance during operation in intense, hostile radiation environments. The detector assembly of the present invention eliminates or reduces many of the problems formerly associated with gas-filled and solid-state electronic detectors.

SUMMARY OF THE INVENTION

The present invention involves neutron detection by multiple solid state neutron detectors. Each individual neutron detector optimizes neutron detection and minimizes gamma ray and other background interferences. The neutron detector array is capable of measuring a wide range of neutron fluxes ranging over several orders of magnitude.

An object of the present invention is to provide a neutron detector array including multiple semiconductor neutron detectors.

Another object of the present invention is to provide a method of detecting neutron fluxes including the steps of placing a neutron detector array having multiple semiconductor neutron detectors in a neutron flux field, and receiving electronic pulses from the neutron detector array which are indicative of the level of neutron flux.

These and other objects of the present invention will become more apparent from the following description.

DESCRIPTION OF THE PREFERRED EMBODIMENTS

Figure 1:
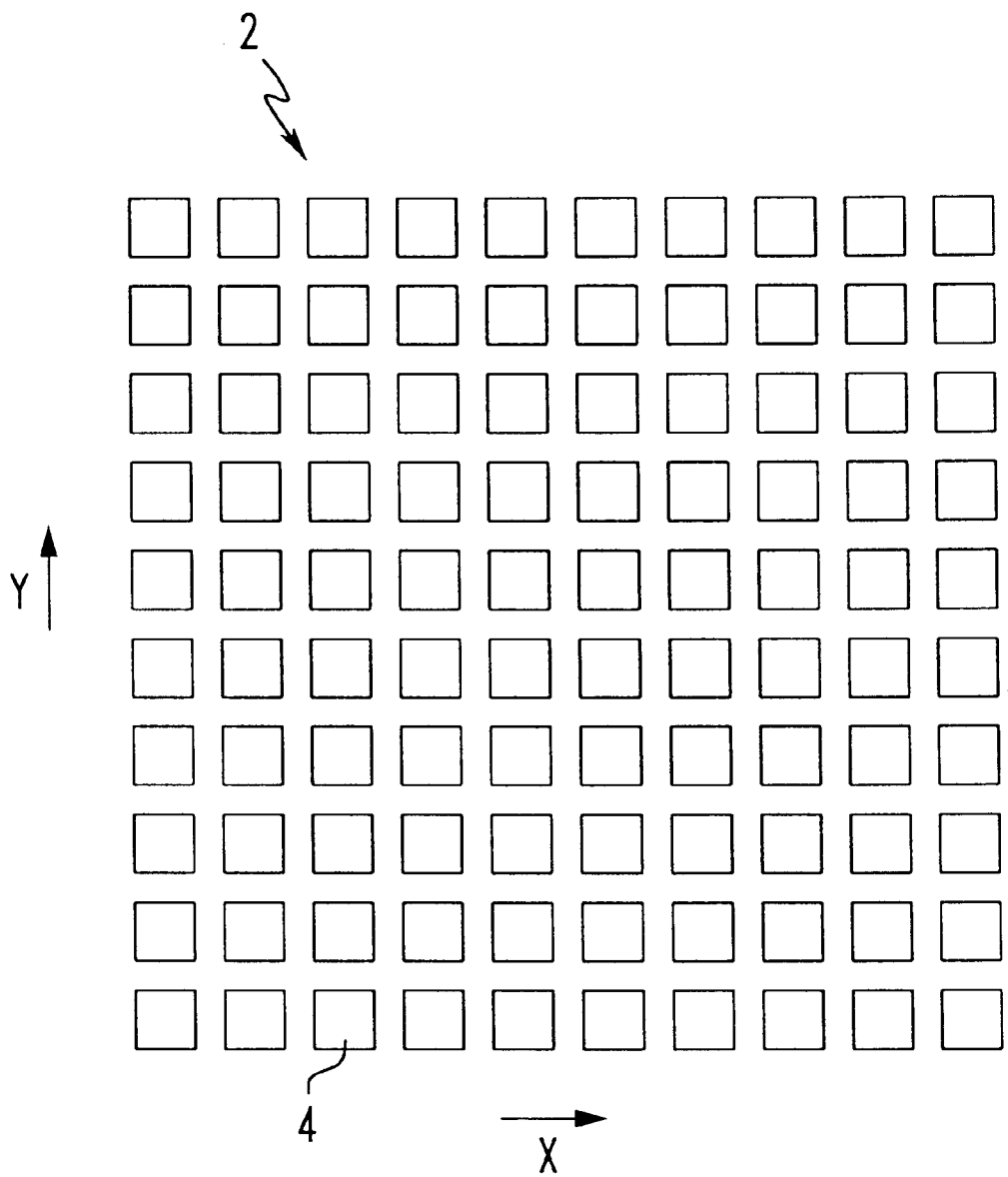
FIG. 1 is a schematic plan view of a neutron detector assembly comprising an array of detectors in accordance with an embodiment of the present invention.

FIG. 1 schematically illustrates a neutron detector array in accordance with an embodiment of the present invention. The array 2 comprises multiple semiconductor neutron detectors 4 positioned along directions X and Y. The number of detectors extending along direction X may be from 1 to about 100, more preferably from about 1 to about 10. The number of detectors extending along direction Y may be from 1 to about 100, more preferably from about 2 to about 10. While a square detector array is shown in FIG. 1, many other array configurations are possible in accordance with the present invention. For example, the array may be rectangular, wherein the number of detectors extending in the X and Y directions are not equal. The array may also be linear, with a single line of detectors extending in either the X or the Y direction. Furthermore, instead of the grid pattern shown in FIG. 1, the detectors may form any suitable pattern such as circular or the like. While each individual detector is shown as a square in FIG. 1, any other suitable shape may be used such as circular or the like.

The size and spacing of the individual semiconductor neutron detectors 4 shown in the array 2 of FIG. 1 may be varied in order to achieve the desired results. For example, the active volume of each detector preferably ranges from about 5×10$^{-6}$ mm$^3$ to about 1 mm$^3$, and more preferably ranges from about 5×10$^{-4}$ mm$^3$ to about 0.01 mm$^3$. Such detectors are typically spaced from about 0.1 mm to about 100 mm apart, preferably from about 1 mm to about 10 mm apart. Miniature detector arrays may therefore be provided with minimal thicknesses, and with surface areas ranging from about 5×10$^{-3}$ mm$^2$ to about 100 mm$^2$, preferably from about 0.1 mm$^2$ to about 10 mm$^2$.

The total number of detectors in the array 2 may range from 2 to about 10,000, depending on the particular application. Preferably, the total number of detectors ranges from about 2 to about 1000, more preferably from about 2 to about 50. Each individual detector preferably has a neutron sensitivity range of a factor of about $10^6$, more preferably about $10^8$, with an absolute neutron sensitivity determined by the thickness of the neutron converter layer. As described more fully below, each individual detector preferably includes a semiconductor active region which has a controlled thickness and which is located in a specified position in relation to a neutron converter layer.

Each individual semiconductor neutron detector of the detector array of the present invention preferably comprises a neutron converter layer and a semiconductor active region which is designed to avoid radiation damage to the semiconductor material. Deterioration of prior art solid state radiation detectors caused by damage by energetic particles is a well known phenomenon. The accumulation of radiation damage in the semiconductor material leads to increased leakage current and decreased charge collection efficiency. This radiation damage is caused by the displacement of atoms in the semiconductor by the energetic charged particles. Over time, this damage causes substantial deterioration of detector performance.

As a charged particle loses energy in a material, it creates both electron excitation events and displaced atoms. The energy loss can be described by the Bragg curve. The neutron detector of the present invention takes advantage of the change in the partitioning between electronic excitation and displacement events along the range of the charged particle. For high energy alpha particles ($^4$He ions), electron excitation is the predominant energy loss mechanism. As the particle loses energy, the importance of displacement damage increases. Most of the displacement damage therefore occurs near the end of the range of travel of the charged particles.

In each semiconductor neutron detector, the type of neutron converter layer, the type of semiconductor material, and the thickness and placement of the semiconductor active region are preferably controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse. The relatively thin semiconductor detector of the present invention is substantially less susceptible to radiation damage than conventional thick semiconductor detectors.

Figure 2:
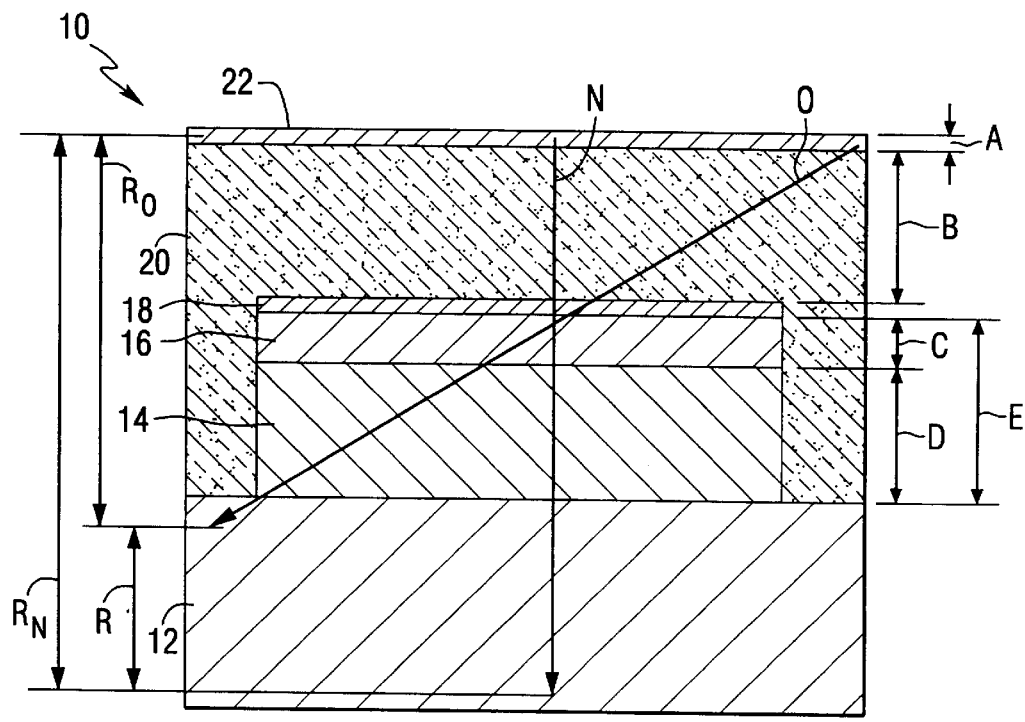
FIG. 2 is a partially schematic side sectional view of a solid state neutron detector in accordance with an embodiment of the present invention.

FIG. 2 schematically illustrates a neutron detector which may be used in an array in accordance with an embodiment of the present invention. FIG. 2 is not drawn to scale for purposes of illustration. The neutron detector 10 preferably includes a substrate 12 made of a semiconductor material such as SiC, GaAs, CdTe, diamond, Ge, Si or other appropriate material. The substrate D preferably has a thickness of about 100 to 1000 microns. For high temperature operations, the substrate 12 is preferably made of temperature resistant materials such as SiC, diamond, silicon nitride, gallium nitride and indium nitride. Where SiC is used as the substrate 12 it may be doped with sufficient amounts of nitrogen or other appropriate impurities to provide sufficient conductivity. The substrate 12 may be formed by processes such as high-purity crystal growth or chemical vapor deposition.

In the embodiment shown in FIG. 2, a semiconductor P-N junction is formed by an N-type semiconductor layer 14 and a P-type semiconductor layer 16. The N-type and P-type semiconductor layers 14 and 16 define the semiconductor active region of the neutron detector 10. Silicon and germanium are suitable semiconductor materials. However, for high temperature operations, the semiconductor active region 14, 16 is preferably made of temperature resistant materials capable of operating at temperatures above 100° C., such as SiC, diamond, GaAs, GaP, PbO and CdS. Where SiC is used as the N-type and P-type layers, such layers are preferably formed by chemical vapor deposition of layers containing an appropriate amount of impurity atoms to increase conductivity. For example, when nitrogen is the dopant, typical concentrations in the N- and P-type layers are about $10^{15}$ and greater than about $10^{19}$ atoms per cm$^3$, respectively.

While the active region shown in FIG. 2 comprises a P-N junction, other types of solid state active regions may be used such as Schottky diodes, diffused junction devices, ion implanted diodes or surface barrier detectors. For example, a Schottky diode may be placed adjacent to a neutron converter layer comprising boron, lithium, uranium or other suitable material. The neutron converter material may serve as the metal rectifying Schottky contact.

Preferred dimensions of the active neutron detector volume are from about 0.1 to about 1000 micron thick with a cross section of from about 10×10 micron to about 1000× 1000 micron, preferably from about 1 to about 5 microns thick with a cross section of about 750 micron×750 micron. The size of such an array is preferably from about 10 to about 15 cm sided square. The sensitivity of the detector is preferably greater than about $5 \times 10^{-5}$ cps/(n/cm$^2$/sec), more preferably about $6 \times 10^{-5}$ cps/(n/cm$^2$/sec) if a 250 $\mu$g/cm$^2$ natural boron converter layer is used. For example, an array consisting of 100×100 of these detector elements has a sensitivity of about 36 cpm/(n/cm$^2$/sec), which is sufficient for monitoring start up fluxes on the order of 1 n/cm$^2$/sec at a nuclear power reactor. For ramp up of a reactor where fluxes range from about $10^3$ to $10^7$ n/cm$^2$/sec, a limited number of the detectors may be sampled over a given time period, e.g, from 10 to 1000 detectors. For full power operation where fluxes are on the order of $10^9$–$10^{11}$ n/cm$^2$/sec, fewer detectors may be sampled, e.g., from 1 to 10 detectors. For higher neutron fluxes, detectors with boron converter layers less than 250 $\mu$g/cm$^2$ are placed in desired locations in the array and sampled to give lower count rates at the higher neutron fluxes.

In the embodiment of FIG. 2, electrical contacts are made to the semiconductor active region 14, 16 by means of the conductive substrate 12 and a thin conductive contact 18. Conventional electrical connections may be made to the substrate 12 and the contact 18 to receive electronic pulses from the semiconductor active region 14, 16 during operation of the detector. The contact 18 preferably has a thickness of from about 0.075 to 1 micron, and is made of any suitable material such as gold, platinum, aluminum, titanium or nickel.

An optional insulating material 20 may be provided around at least a portion of the semiconductor active region 14, 16 in order to protect the active region from mechanical stresses and/or chemical attack. The insulating material 20 may also be used to space the semiconductor active region 14, 16 a desired distance from a neutron converter layer 22, as more fully described below. The insulating material 20 may comprise any suitable material such as oxides, nitrides and phosphides. For high temperature operations, oxides such as SiO$_2$ are particularly suitable. The SiO$_2$ layer may be formed by methods such as chemical vapor deposition.

The neutron detector 10 includes a neutron converter layer 22 which generates charged particles when the layer is impinged by neutrons. The neutron converter layer may comprise a relatively thin film or coating, or may comprise a doped region of the device. The composition of the neutron converter layer 22 is selected such that upon impingement by neutrons, charged particles such as $^1$H, $^3$H, $^7$Li and $^4$He ions are generated. Species capable of generating such charged particles include $^6$Li, $^{10}$B, H, and $^3$He. Alternatively, fissionable materials such as $^{235}$U, $^{233}$U or $^{239}$Pu can be used to produced charged particles in the form of energetic fission fragments. Suitable materials for the neutron converter layer 22 include Li-containing materials such as LiF, Li$_2$O and lithium metal, and B-containing materials such as ZrB$_2$, B$_4$C, H$_3$BO$_3$ and elemental boron. The neutron converter layer 22 may be deposited on the insulating material 20 shown in FIG. 2 by chemical vapor deposition, or manufactured as a free-standing layer which is attached to the device. Alternatively, the neutron converter layer 22 may be deposited directly on the semiconductor active region 14, 16. In this case, the neutron converter layer 22 may be used as an electrical contact in place of the contact 18. For example, the contact 18 may be doped with Li to serve a dual purpose as an electrical contact and a neutron converter layer.

The size of the semiconductor active region 14, 16 and its placement in relation to the neutron converter layer 22 are preferably controlled in order to minimize radiation damage. As shown in FIG. 2, the neutron converter layer 22 is relatively thin, having a thickness A preferably ranging from about 0.1 to about 22 microns. The optional insulating material 20 has a thickness B which is selected in order to minimize displacement damage caused by charged particles, as more fully described below. The thickness B of the insulating material 20 typically ranges from 0 to 10 microns or more. The P-type semiconductor layer 16 has a thickness C, while the N-type semiconductor layer 14 has a thickness D. The thickness C preferably ranges from about 0.1 to about 5 microns, while the thickness D preferably ranges from about 1 to about 10 microns. The semiconductor active region, which is defined by the N-type and P-type layers 14 and 16, has a thickness E. The thickness E preferably ranges from about 1 to about 15 microns, and is selected such that dislocation damage caused by charged particles is minimized.

As shown in FIG. 2, upon impingement by neutrons, some charged particles exit the neutron converter layer 12 in a normal (perpendicular) direction N. As more fully described below, a charged particle traveling along direction N will cause electron excitation events as it travels, and will eventually come to rest a distance $R_N$ from the neutron converter layer 22. The semiconductor active region 14, 16 having the thickness E is positioned in relation to the neutron converter layer 22 such that the charged particles traveling in the direction N cause ionization within the thickness of the semiconductor active region E, and pass through the active region before they come to rest. In this manner, dislocation damage within the active region is minimized.

As shown in FIG. 2, charged particles exiting the neutron converter layer 22 will also travel at non-normal angles, such as in the oblique direction O. Charged particles traveling along direction O pass through the semiconductor active region 14, 16 and come to rest a distance $R_o$ from the neutron converter layer 22. The charged particles thus pass through the semiconductor active region 14, 16 in many different directions ranging from normal angles N to relatively shallow oblique angles O. The range of the charged particles is defined by a band R which is located away from the neutron converter layer a minimum distance of $R_o$ and a maximum distance of $R_N$. As schematically shown in FIG. 2, the range of the charged particles falls in a band R outside of the semiconductor active region 14, 16. Instead of causing dislocation damage within the active region, the charged particles come to rest in the substrate 12.

While the active region shown in FIG. 2 comprises a P-N junction, other types of solid state diodes may be used. For instance, the P and N layers of the P-N junction could be replaced with metal/n$^-$/n$^+$ Schottky diode layers. Thus, for example, a Schottky diode may be used comprising a contact metal layer of Au, Ni or Pt, an n$^-$ layer of SiC, an n$^+$ layer of SiC, and a conductive SiC substrate.

Figure 3:
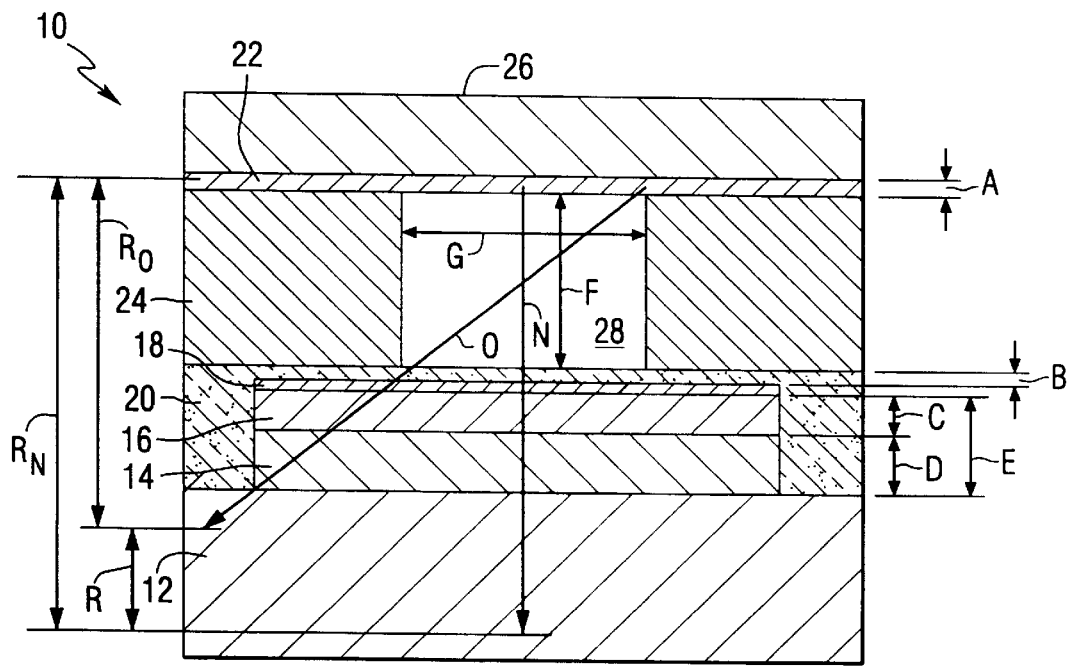
FIG. 3 is a partially schematic side sectional view of a solid state neutron detector in accordance with another embodiment of the present invention.

FIG. 3 schematically illustrates a neutron detector 10 suitable for use in an array in accordance with another embodiment of the present invention. FIG. 3 is not drawn to scale for purposes of illustration. The detector 10 of FIG. 3 likewise includes a substrate 12 having an N-type semiconductor layer 14 and P-type semiconductor layer 16 disposed thereon. An electrical contact 18 and optional insulating material 20 are also incorporated in the detector of FIG. 3. A collimator 24 (not to scale) is positioned between the active region 14, 16 and the neutron converter layer 22. The collimator 24 may be made of any suitable ion absorbing material such as SiO$_2$, SiC or silicon nitride. The collimator 24 includes an inner passage 28 having a length F and a width G. The inner passage may comprise a gas such as air, nitrogen or helium. A cap 26 made of any suitable material such as aluminum or nickel provides support for the neutron converter layer 22. The collimator 24 is used to reduce the number of charged particles which enter the semiconductor active region 14, 16 at shallow angles. The height F of the inner passage 28 is preferably at least twice the width G of the passage. Charged particles exiting the neutron converter layer 22 at highly oblique angles are absorbed by the walls of the collimator 24 and do not pass into the active region 14, 16.

As shown in FIG. 3, charged particles traveling in a normal direction N come to rest a distance $R_N$ from the neutron converter layer 22. Charged particles traveling in an oblique direction O come to rest a distance $R_o$ away from the neutron converter layer 22. The range of the charged particles is defined by a band R which is located a minimum distance $R_o$ from the neutron converter layer 22 and a maximum distance $R_N$ from the neutron converter layer. By increasing the ratio of the height F to width G of the inner passage 28, the maximum angle between the normal direction N and oblique direction O is decreased, thereby decreasing the width of the band R.

Figure 4:
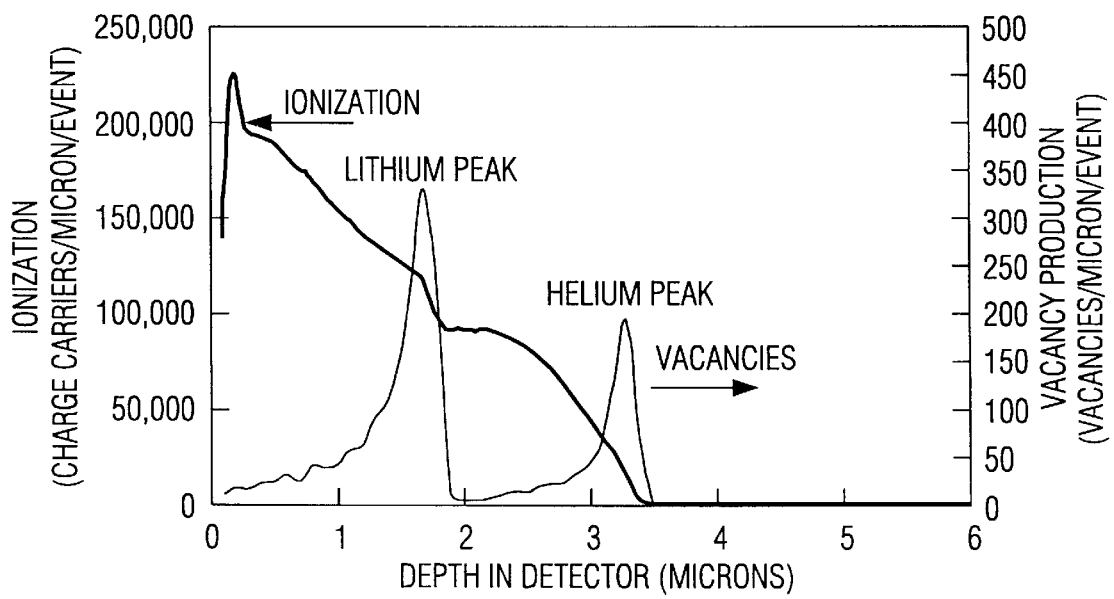
FIG. 4 is a graph of detector depth versus ionization and vacancy production for $^{10}B$ reaction products in a silicon carbide detector.

Energy deposition curves for charged particles in the detector material may be used to determine the appropriate thickness of the semiconductor active region. Such energy deposition curves may be established from the TRIM computer code developed by Biersack and Ziegler, or other conventional range-energy calculation methods. The distribution curves for ionization and vacancy production by a normally incident beam of $^{10}$B reaction products in SiC is illustrated in FIG. 4. The reaction products comprise charged particles of Li and He ions. Due to its relatively high atomic number (Z), the range of the Li ion is relatively short, i.e., about 1.75 microns. The range of the He ion is nearly double the Li ion range. The displacement damage caused by each type of ion occurs near the end of the range. As shown in FIG. 4, in the first micron, the energy loss to ionization is relatively high and only minimal displacement damage occurs. At about 1.6 microns displacement damage caused by Li ions reaches a peak. After about 1.8 microns ionization energy loss again dominates displacement damage. However, at about 3.3 microns dislocation damage caused by He ions reaches a peak. In order to avoid dislocation damage, the semiconductor active region is positioned in a region where ionization energy loss is high and displacement damage is low. Thus, for a normally incident beam of reaction products, the SiC active region may be positioned at a distance of less than about 1.5 microns from the boron neutron converter layer or at a distance between about 1.8 and 3.1 microns from the neutron converter layer.

Figure 5:
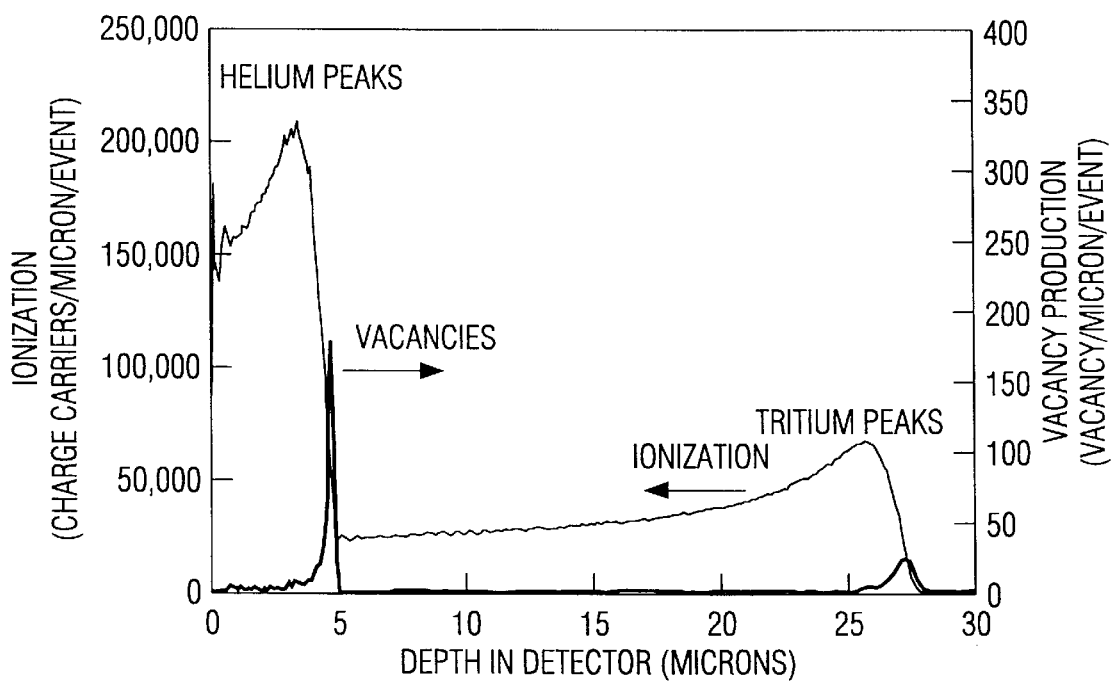
FIG. 5 is a graph of detector depth versus ionization and vacancy production for $^6Li$ reaction products in a silicon carbide detector.

FIG. 5 illustrates energy loss curves for a normally incident beam of $^6$Li reaction products in SiC. The reaction products comprise charged particles of $^4$He and $^3$H (tritium) ions. In comparison with the $^{10}$B reaction products shown in FIG. 4, the near surface low damage zone is larger for the lower Z, higher energy products of the $^6$Li reaction. As shown in FIG. 5, the He ions are the higher Z products with a shorter range of about 4.5 or 5 microns. The H ions have a longer range of about 27 microns. For the lithium reaction products, the low damage region extends over approximately the first 4 microns of the detector. At about 5 microns, dislocation damage caused by He ions reaches a peak, but quickly subsides thereafter. From about 5 microns to about 27 microns, ionization energy loss is again maximized. However, at about 27 microns dislocation damage caused by H ions reaches a peak. Thus, for a normally incident beam of reaction products, the SiC semiconductor active region should therefore be located at a distance of less than about 4 microns from the lithium neutron converter layer or at a distance between about 5 and 27 microns from the neutron converter layer.

Figure 6:
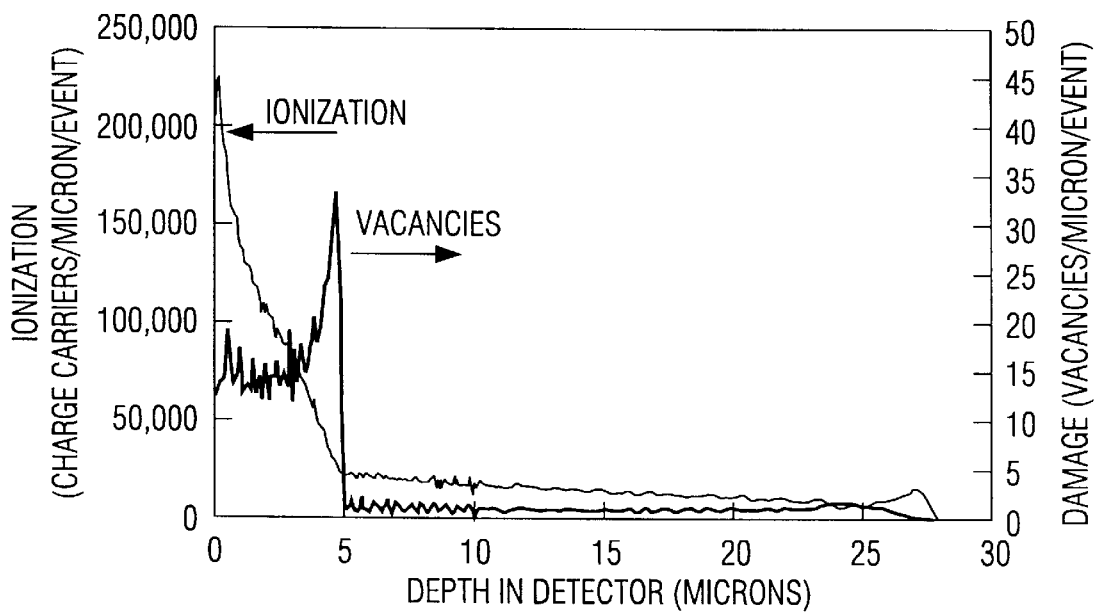
FIG. 6 is a graph of detector depth versus ionization and vacancy production for $^6Li$ reaction products in a silicon carbide detector for randomly distributed reaction products.

The neutron detector is preferably provided with an active zone that corresponds to a region with a high ratio of ionization energy loss to displacement damage production. The spacing between the neutron converter layer and the active region of the detector is preferably controlled depending on the incident radiation. For a normally incident beam, the neutron converter layer may advantageously be placed adjacent to the semiconductor active region. However, the angular distribution of reaction product ions exiting the neutron converter layer is usually random. This leads to a broadening of the energy dissipation curves as illustrated in FIG. 6 for the $^6$Li reaction. For this broadened curve, with SiC as the semiconductor active region, the maximum ionization to displacement ratio occurs between about 5 and 15 microns. Thus, the SiC active region is preferably about 5 to 10 microns thick and is spaced about 5 microns from the neutron converter layer. The semiconductor active region is thereby positioned away from the neutron converter layer in a location where the ratio of ionization energy loss to displacement damage is maximized.

Figure 7:
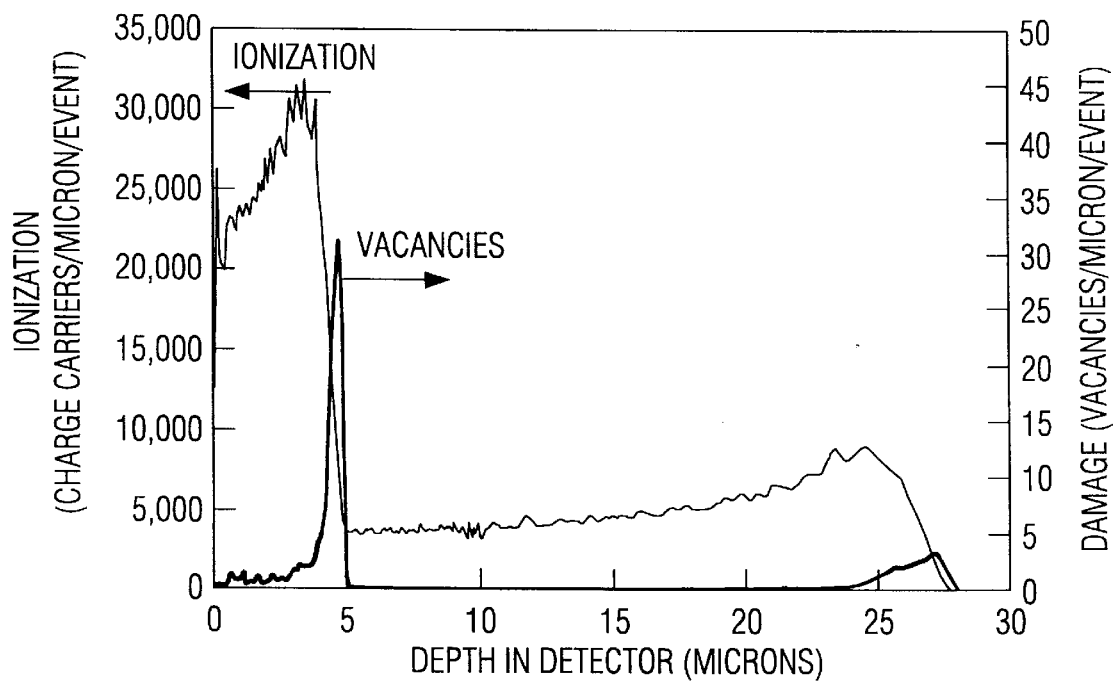
FIG. 7 is a graph of detector depth versus ionization and vacancy production for $^6Li$ reaction products in a silicon carbide detector with collimated reaction products.

An energy deposition curve for a collimated beam with Li as the neutron converter layer and SiC as the semiconductor active region is shown in FIG. 7. Although slight broadening of the damage peak is noted, the number of vacancies produced in the first 3.5 microns of the detector approximates the levels obtained from a normally incident beam, as shown in FIG. 5. While the use of a collimator may reduce the overall signal of the device by eliminating a proportion of the incident radiation, compensation for this signal loss may be provided by increasing the concentration of Li in the neutron converter layer. Alternatively, microchannelling devices may be used to eliminate shallow incident angles. However, the increased collimation provided by such devices may not be sufficient to justify the resultant decrease in signal intensity.

The neutron detector arrays of the present invention are capable of detecting neutron fluxes over several orders of magnitude, e.g., 5 orders of magnitude or more. The arrays are preferably capable of generating an electronic pulse for neutron fluxes ranging from about 1 to $10^{10}$ n/cm$^2$/sec, and more preferably from about 0.1 to $10^{12}$ n/cm$^2$/sec. The detector arrays are thus suitable for many different applications, including power monitoring of nuclear reactors. The ability to measure a wide range of nuclear fluxes makes the detector arrays particularly suitable for monitoring nuclear reactor start up, ramp up and full power operations.

A large dynamic range for neutron detection can be obtained by selectively processing the signal from a fraction of the array to avoid counting losses associated with high count rates. For example, at a neutron flux of $10^{11}$ n/cm$^2$/sec, typical of the highest fluxes encountered in reactor cavity source range monitors at commercial power reactors, the count rate for an individual sensor in the array would be about $6\times10^6$ cps which can be processed electronically in the pulse operation mode. In the pulse mode of operation, the total charge produced in the detector by each individual neutron interaction is collected independently as a single electronic pulse. Alternatively, all of the charge produced by neutron interactions can be summed over a time period, and the total current is measured. In the current mode, the details of the magnitude of the charge deposited by individual interactions are lost. In the pulse mode, unwanted pulses which may result from electronic or gamma ray-induced background can be discriminated on the basis of pulse amplitude. The range from start up (<1 n/cm$^2$sec) to full power ($10^{11}$ n/cm$^2$/sec) covers over eleven orders of magnitude. This range can be effectively covered by summing the signals from a selected fraction of the detector array. In the case of a nuclear reactor of the Pressurized Water Reactor (PWR) design, the array may be positioned in the annular gap between the outer surface of the reactor pressure vessel and the biological shield. In contrast, the gas-filled ionization detectors presently used for reactor power monitoring in PWRs are located in the reactor cavity.

The preferred neutron detectors for use in accordance with the present invention possess several advantages over conventional designs. The use of a relatively thin semiconductor active region substantially reduces radiation damage. The use of a thin semiconductor active region also provides for gamma discrimination because the active thickness of the detector may be less than the range of most gamma radiation. This allows the detectors to measure neutron flux in the presence of large gamma fields. Furthermore, the use of high temperature resistant materials such as silicon carbide in the active region of the detector permits extended use in high temperature environments such as nuclear reactors.

The neutron detector arrays of the present invention have many advantages when compared with conventional detectors presently in use. In the preferred embodiment, more than eleven orders of magnitude in neutron sensitivity can be covered by the detector. By comparison, the source range monitors presently in use in commercial power reactors cover a similar range with a set of three detectors with overlapping sensitivity ranges. The preferred detector array of the present invention can cover the above-stated dynamic range while operating in the pulse mode over the entire range. Pulse-mode operation facilitates the task of discriminating against gamma ray background. Conventional neutron detectors must be operated in the current mode at higher fluxes, making pulse height discrimination against gamma ray background impossible. Conventionally, compensated ion chambers (CICs) must be used to remove gamma ray background at high neutron fluxes.

In accordance with the present invention, the possible failure of individual detector elements can be detected by sampling different detectors in the array. The signal from failed elements can be eliminated from the final processed output. Continued operation remains possible, even though a sizable fraction of the individual detector elements may have failed. Failure of individual components in conventional power reactor neutron monitors can require shutdown of the reactor for maintenance.

Furthermore, the preferred detectors are inherently more resistant to the effects of radiation damage. Because the pulse mode of operation is used, variations in the output pulses resulting from radiation damage to the detector will not have as severe an effect on detector count rate as would result in the current mode of operation where pulses are summed and only net current is monitored. The preferred miniature detector elements are more resistant to the electronic effects of radiation damage because charge collection distances are much smaller, making the chances that charge will be lost to defects such as neutron produced hole trapping sites much less likely than for larger volume solid state detectors. Less net radiation-induced damage is produced in the preferred miniature detector, reducing or eliminating the use of elevated temperature annealing cycles to remove radiation damage.

Because of the small active volume and resultant short charge collection distances, the preferred detectors are faster and are capable of higher count rates than conventional neutron detectors. Also, the faster response time allows more rapid detection of sudden changes in neutron flux and provides for better operation safety margins.

In accordance with the present invention, extended arrays can be used and different parts of the array can be sampled to map complex neutron flux distributions. The detector array can also be used to perform neutron energy spectral measurements. For example, spectral sets of fissionable radiator foils ($^{235}$U, $^{239}$Pu, $^{237}$Np and $^{238}$U) may be used as converter foils on individual sensors to determine the fluence rate and energy spectra information that is currently obtained in reactor cavity pressure vessel neutron dosimetry using solid state track recorders (SSTRs). The present detector array provides an active, on-line alternative to the passive SSTRs. Furthermore, the present detector array may be used as a safeguard to monitor spent nuclear fuel to make sure the neutron output from such spent fuel follows the predicted rate based on records of enrichment and fuel burn up.

The following examples are intended to illustrate various aspects of the present invention and are not intended to limit the scope thereof.

EXAMPLE 1

A neutron detector is made by forming a SiC substrate 500 microns thick. The SiC substrate is formed by the process of high-purity crystal growth. An N-type SiC layer 8 microns thick and 400 microns in diameter having a dopant concentration of $1\times10^{15}$ nitrogen atoms per cm$^3$ is deposited on the SiC substrate by chemical vapor deposition. A P-type SiC layer 1.2 microns thick and 400 microns in diameter having a dopant concentration of $10^{19}$ nitrogen atoms per cm$^3$ is deposited on the N-type layer by chemical vapor deposition. An electrical contact layer comprising gold having a thickness of 0.2 micron is deposited on the P-type layer by vapor deposition. A layer of SiO$_2$ having a thickness of 1.5 microns is deposited over the contact layer and doped SiC layers by chemical vapor deposition. A neutron converter layer 2 microns thick comprising $^6$LiF is deposited on the SiO$_2$ insulating layer by chemical vapor deposition. Electrical connections are made to the conducting SiC substrate and contact layer by means of micro soldering.

EXAMPLE 2

A neutron detector is made by forming a SiC substrate 500 microns thick. The SiC substrate is formed by the process of high-purity crystal growth. An n$^+$ layer 1.5 microns thick and 400 microns in diameter having a dopant concentration of greater than $10^{18}$ nitrogen atoms per cm$^3$ is deposited on the SiC substrate by chemical vapor deposition. An n$^-$ layer 3 microns thick with a diameter of 400 microns having a nitrogen impurity concentration of $10^{15}$ atoms per cm$^3$ is deposited on the n$^-$ layer by chemical vapor deposition. A Schottky metal contact consisting of 0.05 microns of nickel with a diameter of 400 microns is deposited on the n$^-$ SiC layer by vacuum deposition. A gold protective layer 1 micron thick with a diameter of 400 microns is deposited on the nickel Schottky layer. A neutron converter layer 2 microns thick and 400 microns in diameter comprising Li is deposited on the gold protective layer by vapor deposition. Electrical contacts are established to the SiC substrate and Schottky metal by micro soldering and a metallic pad contact, respectively.

EXAMPLE 3

A neutron detector is formed as in Examples 1 and 2, except a collimator structure is added. In the case of the detector of Example 1, the collimator structure is placed between the SiO$_2$ layer and the neutron converter layer. In the case of Example 2, the collimator structure is placed between the gold protective layer and the neutron converter layer. In both cases, the neutron converter layer is free-standing and is made by vacuum deposition of LiF onto a nickel backing layer 150 microns thick. The collimator structure consists of an annular aluminum layer with a thickness of 400 microns and a diameter of 400 microns, and having an annulus with a diameter of 200 microns. The collimator structure is produced by a combination of vapor deposition and reactive-ion etching.

Multiple detectors made in accordance with the above examples may be formed into an array as shown in FIG. 1 and discussed previously. To achieve maximum sensitivity for a multi-detector array, the signals from all of the detectors are processed in parallel and summed. To reduce the sensitivity to match higher neutron flux measurements, individual detectors are progressively disconnected by electronic switching.

For example, the methods of wiring individual detectors in parallel and summing the signals may be achieved by using six detectors and verifying that the summed output sensitivity is six times the sensitivity of each individual detector.

While certain embodiments of the present invention have been described, various changes, modifications and adaptations may be made without departing from the scope of the invention, as set forth in the following claims.

What is claimed is:

1. A neutron detector array comprising a plurality of semiconductor neutron detectors and means for processing signals from selected semiconductor neutron detectors of the array depending on the level of neutron flux received by the array.

2. The neutron detector array of claim 1, wherein the array comprises from 2 to about 10,000 of the semiconductor neutron detectors.

3. The neutron detector array of claim 1, wherein each of the semiconductor neutron detectors comprises a semiconductor active region having a volume of from about $5\times10^{-6}$ to about 1 $mm^3$.

4. The neutron detector array of claim 1, wherein the detector has a thickness of less than about $10^4$ mm and a surface area of less than about $5\times10^{-3}$ $mm^2$.

5. The neutron detector array of claim 1, wherein each of the semiconductor neutron detectors has a neutron sensitivity range of about a factor of $10^6$.

6. The neutron detector array of claim 1, wherein the array can detect neutron fluxes ranging over 10 orders of magnitude.

7. The neutron detector array of claim 1, wherein the array is capable of providing measurements for neutron fluxes ranging from 1 to $5\times10^{10}$ $n/cm^2/sec$.

8. The neutron detector array of claim 1, wherein the array is capable of providing measurements for neutron fluxes ranging from 0.01 to $10^{13}$ $n/cm^2/sec$.

9. The neutron detector array of claim 1, wherein the number of semiconductor neutron detectors from which the signals are processed are decreased as the level of neutron flux is increased.

10. The neutron detector array of claim 1, wherein the means for processing signals includes means for pulse mode operation.

11. The neutron detector array of claim 1, wherein the semiconductor neutron detectors include a semiconductor active region comprising SiC.

12. A method of detecting neutron fluxes comprising:

placing a neutron detector array comprising a plurality of semiconductor neutron detectors in a neutron flux field;

receiving electronic pulses from the neutron detector array; and processing signals from selected semiconductor neutron detectors of the array depending on the level of neutron flux received by the array.

13. The method of claim 12, wherein the neutron detector array detects neutron fluxes ranging over 10 orders of magnitude.

14. The method of claim 12, wherein the neutron detector array generates electronic pulses for neutron fluxes ranging from 1 to $5\times10^{10}$ $n/cm^2/sec$.

15. The method of claim 12, wherein the neutron detector array generates electronic pulses for neutron fluxes ranging from 0.1 to $10^{12}$ $n/cm^2/sec$.

16. The method of claim 12, further comprising decreasing the number of semiconductor neutron detectors from which the signals are processed as the level of neutron flux is increased.

17. The method of claim 12, further comprising sampling different detectors of the array to determine whether an individual detector has failed.

18. The method of claim 12, further comprising sampling different detectors of the array to determine neutron flux distribution across the array.

19. The method of claim 12, wherein each of the semiconductor neutron detectors is capable of a count rate of at least about $10^5$ cps.

20. The method of claim 12, wherein the neutron fluxes are generated by a nuclear power reactor during start up, ramp up and full power of the reactor.

21. The method of claim 12, further comprising providing the semiconductor neutron detectors with different converter layers and measuring a neutron energy spectrum of the neutron flux.

22. The method of claim 12, wherein the semiconductor neutron detectors include a semiconductor active region comprising SiC.

23. A method of detecting neutron fluxes comprising:

placing a neutron detector array comprising a plurality of semiconductor neutron detectors in a neutron flux field;

receiving electronic pulses from the neutron detector array; and sampling different detectors of the array to determine whether an individual detector has failed.

* * * * *